United States Patent
Tsuge et al.

(10) Patent No.: US 8,915,352 B2
(45) Date of Patent: Dec. 23, 2014

(54) FEEDING SYSTEM FOR REDUCED IRON MATERIAL

(75) Inventors: Osamu Tsuge, Shinagawa-ku (JP); Tomoki Uemura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/820,263

(22) PCT Filed: Aug. 31, 2011

(86) PCT No.: PCT/JP2011/069792
§ 371 (c)(1),
(2), (4) Date: Mar. 1, 2013

(87) PCT Pub. No.: WO2012/029862
PCT Pub. Date: Mar. 8, 2012

(65) Prior Publication Data
US 2013/0153368 A1   Jun. 20, 2013

(30) Foreign Application Priority Data
Sep. 1, 2010   (JP) .................... 2010-196061

(51) Int. Cl.
*B65G 27/00*   (2006.01)
(Continued)

(52) U.S. Cl.
CPC ............ *B65G 27/00* (2013.01); *C21B 13/0053* (2013.01); *C21B 13/10* (2013.01);
(Continued)

(58) Field of Classification Search
USPC .............. 198/550.01, 560, 752.1, 550.4, 562, 198/758; 126/7, 10, 68, 73, 107, 501; 266/176, 199; 110/118, 165 R, 219, 110/220, 255, 258, 267, 293
See application file for complete search history.

(56) References Cited

U.S. PATENT DOCUMENTS 3,621,981 A * 11/1971 Nimmo et al. ............. 198/419.2
4,697,274 A    9/1987 Enkner et al.
(Continued)

FOREIGN PATENT DOCUMENTS

EP    0 176 497 A1   4/1986
JP    2 206727       8/1990
(Continued)

OTHER PUBLICATIONS

Written Opinion of the International Searching Authority Issued Oct. 26, 2011 in PCT/JP11/69792 Filed Aug. 31, 2011 (with English translation).

(Continued)

*Primary Examiner* — Leslie A Nicholson, III
(74) *Attorney, Agent, or Firm* — Oblon, Spivak, McClelland, Maier & Neustadt, L.L.P.

(57) ABSTRACT

Not only the cracking of granular reduced iron materials is reduced, but also reduced iron materials are fed uniformly onto a furnace floor regardless of a width of the furnace floor. A feeding system for reduced iron material includes a plurality of material feeding equipments 4 provided in a furnace width direction of a mobile furnace floor type reduction melting furnace, wherein each of the material feeding equipments 4 is constructed by a hopper 10 configured to receive reduced iron materials and discharge the materials from a discharge port 10a, a trough 14 configured to connect the discharge port 10a and a material charging portion of the mobile furnace floor type reduction melting furnace configured to receive the reduced iron materials discharged from the discharge port 10a, an exit portion provided on an exit side of the trough 14, and a vibration applying unit configured to cause the trough to vibrate along a furnace floor moving direction.

20 Claims, 6 Drawing Sheets

(51) Int. Cl.
  *C21B 13/00* (2006.01)
  *C21B 13/10* (2006.01)
  *F27B 9/16* (2006.01)
  *F27B 9/38* (2006.01)
  *F27D 3/00* (2006.01)

(52) U.S. Cl.
  CPC ... *F27B 9/16* (2013.01); *F27B 9/38* (2013.01); *F27D 2003/0004* (2013.01)
  USPC .................. 198/752.1; 198/550.01; 198/560; 198/562

(56) References Cited

U.S. PATENT DOCUMENTS

| | | | | |
|---|---|---|---|---|
| 5,489,019 A * | 2/1996 | DiNanno et al. | ............ | 198/752.1 |
| 6,251,161 B1 * | 6/2001 | Tateishi et al. | .................. | 75/484 |
| 6,630,010 B2 * | 10/2003 | Ito et al. | ......................... | 75/484 |
| 6,631,799 B2 * | 10/2003 | Samson | ........................ | 198/771 |
| 6,811,743 B2 * | 11/2004 | Harada | ......................... | 266/176 |
| 7,559,725 B2 * | 7/2009 | Mathis et al. | .................. | 406/168 |
| 8,225,925 B2 * | 7/2012 | Bassani | ......................... | 198/758 |
| 2001/0027701 A1 | 10/2001 | Ito et al. | | |
| 2004/0020326 A1 | 2/2004 | Ibaraki et al. | | |
| 2010/0294079 A1 | 11/2010 | Ibaraki et al. | | |

FOREIGN PATENT DOCUMENTS

| | | |
|---|---|---|
| JP | 3075722 | 8/2000 |
| JP | 2000-310488 A | 11/2000 |
| JP | 2001 294922 | 10/2001 |
| JP | 2002 206119 | 7/2002 |
| JP | 3978756 | 9/2007 |

OTHER PUBLICATIONS

International Search Report Issued Nov. 8, 2011 in PCT/JP11/69792 Filed Aug. 31, 2011.

Extended European Search Report issued Feb. 17, 2014 in Patent Application No. 11821877.5.

\* cited by examiner

FEEDING SYSTEM FOR REDUCED IRON MATERIAL

TECHNICAL FIELD

The present invention relates to a feeding system for reduced iron material, for feeding lump-formed materials, each of which contains a carbonaceous reducing agent and an iron oxide and is formed into a lump, to a mobile reduction melting furnace as reduced iron materials.

BACKGROUND ART

Figure 12:
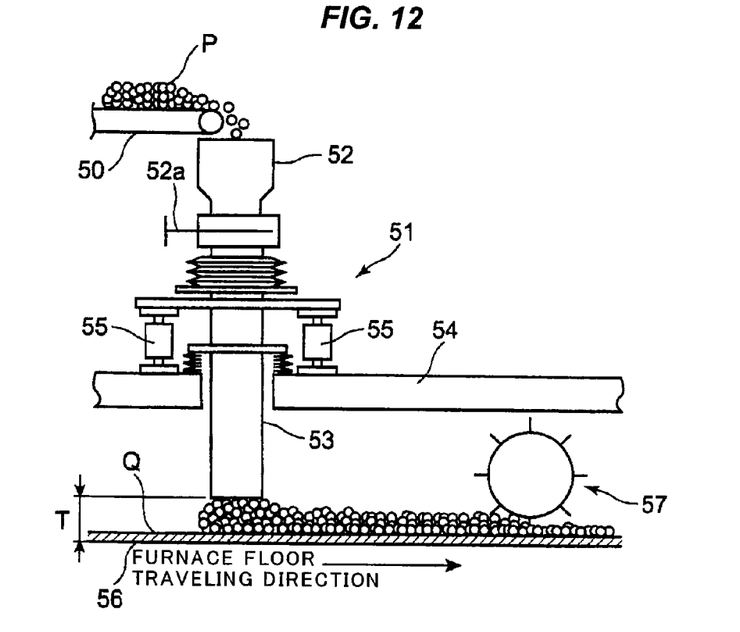
FIG. 12 is a side view showing a configuration of a reduced iron material feeding equipment in the prior art.

FIG. 12 shows a configuration of the conventional reduced iron material feeding equipment that feeds granular reduced iron materials, each of which contains a carbonaceous reducing agent and an iron oxide as main components, to the mobile furnace floor furnace.

In FIG. 12, the granular reduced iron materials that are dried by a drier (called "pellets" hereinafter) are conveyed to a reduced iron material feeding equipment 51 by a belt conveyor 50.

The reduced iron material feeding equipment 51 is constructed mainly by a material reception hopper 52, a cylinder member 53 arranged under the material reception hopper 52, and a plurality of electric cylinders 55 provided onto a furnace main body ceiling 54 to move the cylinder member 53 vertically.

Each of the electric cylinders 55 move the cylinder member 53 up and down to adjust a clearance T between a lower end of the cylinder member 53 and the furnace floor 56, so that the pellets P are fed onto a furnace floor 56 while controlling an amount of supply.

Here, a slide gate 52a for opening/closing the exhaust port is provided to the lower portion of the material reception hopper 52, and a leveling unit 57 is arranged on the downstream side of the cylinder member 53 in the furnace floor traveling direction (see Patent Reference 1, for example).

Figure 13A:
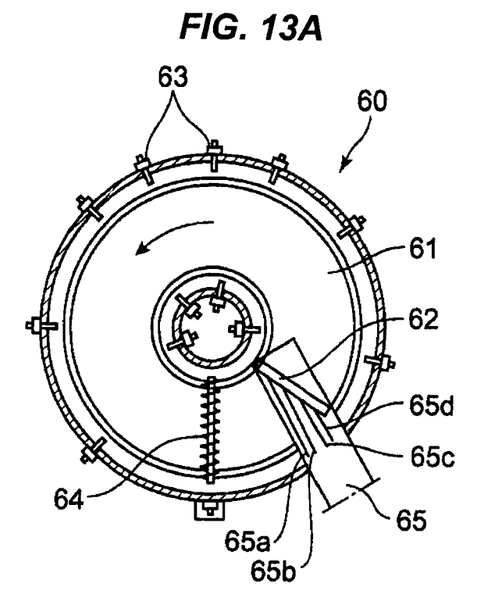
FIG. 13A is a plan view of another reduced iron material feeding equipment in the prior art, and FIG. 13B an enlarged view of a trough shown in FIG. 13A.

Also, in the reduced iron material feeding equipment for use in a rotary furnace floor shown in FIG. 13A, one slit 62 is opened in a furnace lid of a furnace main body 60 to extend over a width of a rotary furnace floor 61. The slit 62 is formed to face on the material charging port provided just under this slit 62.

In FIG. 13A, 63 denotes each of burners that are provided in plural on the side wall of the furnace main body 60, and 64 denotes a screw that discharges the reduction produced metals to the outside of the furnace main body 60.

The pellets are fed from a trough 65 of a vibrating conveyor onto the rotary furnace floor 61 through the slit 62 and the material charging port.

Figure 13B:
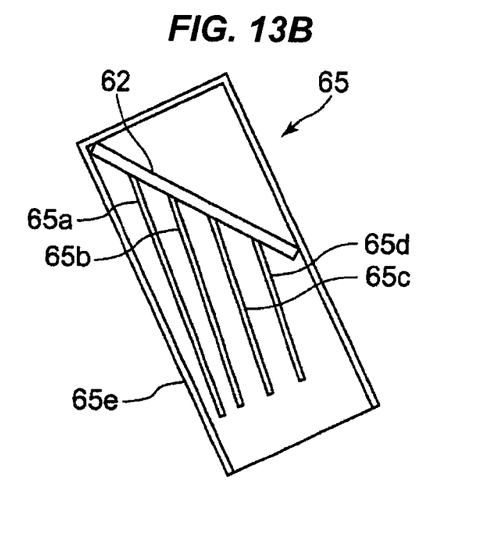

Also, as shown in an enlarged view of the trough in FIG. 13B, a plurality of partitions 65a to 65d for guiding the pellets separately are provided to the trough 65 obliquely to a trough side wall 65e, and the trough is constructed such that an amount of pellets being fed onto the rotary furnace floor 61 is reduced gradually from an outer peripheral portion to an inner peripheral portion of the rotary furnace floor 61 (see Patent Reference 2, for example).

CITATION LIST

Patent Reference

Patent Reference 1: Japanese Patent No. 3075722
Patent Reference 2: Japanese Patent No. 3978756

SUMMARY OF THE INVENTION

Problems that the Invention is to Solve

However, in the reduced iron material feeding equipment 51 shown in FIG. 12, it is feared that the pellets existing between the lower end of the cylinder member 53 and the furnace floor 56 are dragged by the furnace floor 56 and are cracked or powdered. Also, in some cases the layered furnace floor material Q that is required for the long-term continuous operation in manufacturing the metal iron may be scraped off the furnace floor, which may exert a bad influence upon the reduction melting reaction.

Also, in the above reduced iron material feeding equipment 51, the pellets are fed intensively onto the furnace floor 56 via the cylinder member 53. Therefore, the leveling unit 57 for spreading uniformly the lump-formed pellets being fed to the furnace floor 56 over the furnace floor 56 is required. However, this leveling unit 57 does not have a function of leveling the powders that are produced in course of carrying the pellets. As a result, such a problems exists that the powders of the reduced iron material are accumulated in the same position on the furnace floor 56.

These accumulated powders of the reduced iron material inhibit not only the speeding up of a reduction melting reaction of the reduced iron materials but also the continuous operation because these powders get into the furnace floor materials to form the iron plate layer on the furnace floor.

In contrast, the reduced iron material feeding equipment shown in FIGS. 13A and 13B is constructed such that the vibrating conveyor should be provided to have a length that can cover the entire furnace width of the furnace floor.

However, when the furnace floor width is expanded to realize upsizing of the furnace main body, it is necessary to design a large-sized vibrating conveyor that can cover the entire furnace width. Therefore, it is virtually impossible to cope with such large-sized vibrating conveyor.

Also, in the reduced iron material feeding equipment shown in FIGS. 13A and 13B, there exists such a problem that, under the condition that a moving velocity of the pellets flowing on the trough 65 is affected by a variation in a grain diameter of the pellets or produced powders, an amount of pellets being fed to the outer peripheral portion and the inner peripheral portion of the furnace respectively cannot be controlled individually.

In this manner, the reduced iron material feeding equipments mentioned above in the prior art have various troubles in mass-producing the high-grade metal iron.

The present invention has been made in view of the problems in the above-mentioned reduced iron material feeding equipments in the prior art, and aims to provide a feeding system for reduced iron material, capable of not only reducing the cracking of granular reduced iron materials but also feeding reduced iron materials uniformly onto a furnace floor regardless of a width of the furnace floor.

Means to Solve the Problems

According to an aspect of the invention, there is provided a feeding system for reduced iron material including a plurality of material feeding equipments provided in a furnace width direction of a mobile furnace floor type reduction melting furnace, wherein each of the material feeding equipments includes: a hopper configured to receive reduced iron materials and discharge the materials from a discharge port; a trough configured to connect the discharge port and a material charging portion of the mobile furnace floor type reduction melting furnace and configured to receive the reduced iron materials discharged from the discharge port; an exit portion provided on an exit side of the trough; and a vibration applying unit configured to cause the trough to vibrate along a furnace floor moving direction.

In the present invention, the material feeding equipments are arranged in a zigzag fashion in the furnace width direction. According to this zigzag arrangement, respective discharge ports of the material feeding equipments can be positioned to come closer to each other in the furnace width direction, and the reduced iron materials can be fed to the furnace floor without interruption, and thus the furnace floor can be utilized fully and effectively. Also, according to this zigzag arrangement, it becomes possible for the worker to approach each of the material feeding equipments from the furnace width direction, and thus the maintenance performance of the material feeding equipment can be improved.

Also, an amount of supply of reduced iron materials can be controlled every material feeding equipment. Therefore, for example, in the case where the mobile furnace floor type reduction melting furnace is constructed by the rotary furnace floor furnace, a spreading density of the reduced iron materials that are spread over the furnace floor can be controlled substantially uniformly over the furnace width when the material feeding equipments are controlled such that an amount of supply is gradually reduced toward the material feeding equipment located on the inner peripheral side from the material feeding equipment located on the outer peripheral side. As a result, the reduced iron materials can be controlled to form one layer, and thus productivity of the metal iron can be enhanced.

It is preferable that a connection portion configured to connect an exit portion of the trough and the material charging portion of the mobile furnace floor type reduction melting furnace should be formed into an oval shape when viewed from the top side.

In the present invention, a rectangle chute is provided as the exit portion, and reinforcing ribs are provided in the chute. Accordingly, it can be prevented that the chute is deformed when such chute is subjected to a radiant heat from the inside of the furnace.

Also, a height from a furnace floor of the mobile furnace floor type reduction melting furnace to the exit portion of the trough is set to 1,200 mm or less. Accordingly, the cracking or the powdering of the reduced iron materials can be prevented.

Also, a lower end of the chute is provided to overlap with the material charging portion. Accordingly, the accumulation of the powders produce from the pellets can be prevented.

Also, the material charging portion is constructed by a water cooling wall. Accordingly, thermal deformation can be prevented. Also, a refractory is installed on an outer side of the wall. Accordingly, a heat loss can be suppressed.

Also, a load distributing unit is provided to an upper portion of the hopper. Accordingly, the load is not applied to the vibrating feeder at a time in feeding the pellets, so that an action of the vibrating unit can be stabilized.

Also, a reception port configured to receive the reduced iron material is provided on an inlet side of the trough, and the discharge port of the hopper and the reception port are connected via an expansion joint that has an airtight performance. Accordingly, the connection portion between the hopper and the trough can be gas-sealed.

The supply hopper is provided to an upper portion of the trough and then both equipments are connected by the expansion joint, and a charging layer of the reduced iron materials is formed in the supply hopper. Besides, the exit portion of the trough and the material charging portion of the mobile furnace floor type reduction melting furnace are connected via a sealing material that has flexibility. Accordingly, an in-furnace gas in the mobile furnace floor type reduction melting furnace can be isolated from an atmospheric air.

In the present invention, a distributing and feeding equipment configured to distribute and feed the reduced iron materials to respective hoppers every predetermined amount is provided. Therefore, the powders produced in course of carrying the reduced iron materials, together with the reduced iron materials, can be charged uniformly into respective hoppers. As a result, the unbalanced accumulation of the powders on the furnace floor, which inhibits a reaction of the reduced iron materials, can be prevented.

In the present invention, a screen unit can be provided on an upstream side of the distributing and feeding equipment in a flow along which the reduced iron materials are fed.

Effects of the Invention

According to the present invention, such advantages can be achieved that not only the cracking of granular reduced iron materials is reduced but also reduced iron materials are fed uniformly onto the furnace floor regardless of a width of the furnace floor.

MODES FOR CARRYING OUT THE INVENTION

The present invention will be explained in detail with reference to an embodiment illustrated in the drawings hereinafter.

1. Rotary Furnace Floor Furnace

Figure 1:
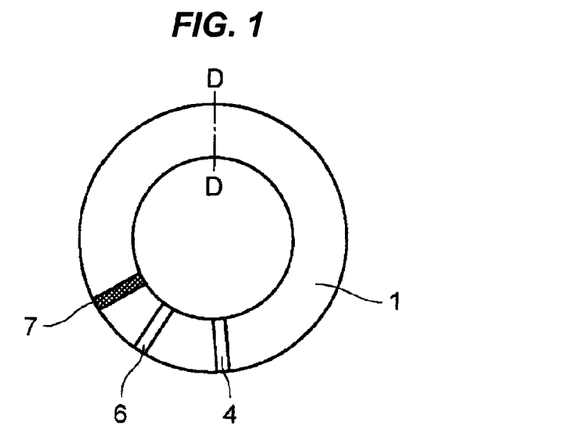
FIG. 1 is a schematic plan view of a rotary furnace floor furnace according to the present invention.
Figure 2:
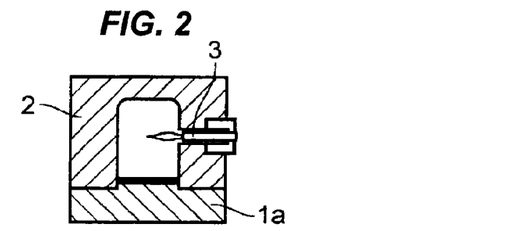
FIG. 2 is a longitudinal sectional view taken along a D-D line in FIG. 1.

A rotary furnace floor furnace acting as a mobile reduction melting furnace, to which a feeding system for reduced iron material of the present invention is applied, is equipped with a doughnut-shaped rotary moving floor. FIG. 1 shows a schematic plan view of a rotary furnace floor furnace 1 according to the present invention, and FIG. 2 is a longitudinal sectional view taken along a D-D line in FIG. 1.

In both Figures, a furnace floor 1a of the rotary furnace floor furnace 1 is constructed such that this furnace floor is rotated by a driving device (not shown) at a predetermined speed.

A combustion burner 3 is provided in plural to appropriate locations of the wall surface of a furnace body 2. A combustion heat and a radiant heat from these combustion burners 3 are transferred to the pellets, for example, as lump-formed materials on the furnace floor 1a, so that the pellets are reduced and melted by the heating.

In this case, as the lump-formed materials, various modes such as pellet-formed materials, briquette-formed materials, and the like may be illustrated.

Figure 3:
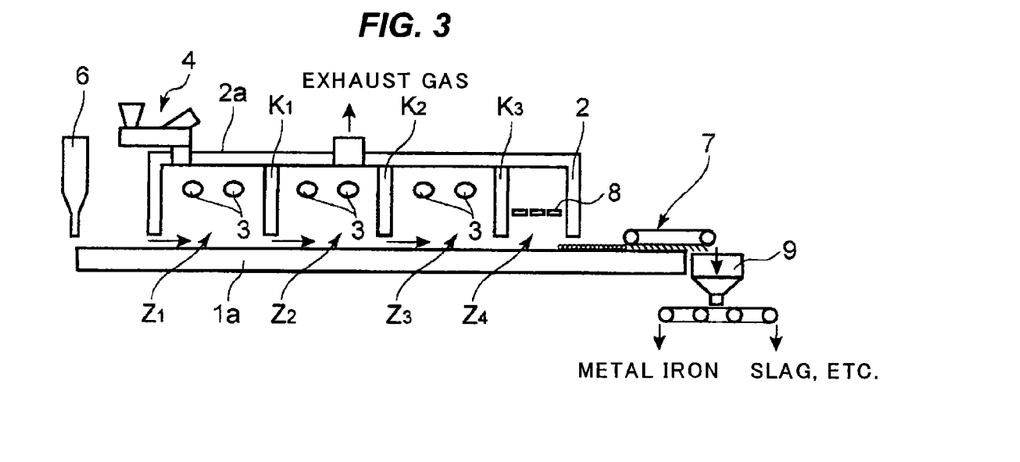
FIG. 3 is an explanatory view showing the rotary furnace floor furnace in FIG. 1 in an expanded fashion in the direction of rotational movement.

FIG. 3 is an explanatory view in which the rotary furnace floor furnace shown in FIG. 1 is shown in an expanded fashion in the direction of rotational movement, to explain heating reduction melting steps.

In FIG. 3, an internal structure of the furnace body 2 is partitioned into a reduction zone $Z_1$ to a cooling zone $Z_4$ by partition walls $K_1$ to $K_3$ respectively. Also, a material feeding equipment 4 and a furnace floor material charging equipment 6 are provided on the upstream side of the rotation direction of the furnace body 2 to face to the furnace floor 1a. Also, a discharging unit 7 is provided on the lowermost downstream side of the rotation direction (actually, the immediately upstream side of the furnace floor material charging equipment 6 because the furnace body is constructed as a rotating structure).

Upon operating the rotary furnace floor furnace 1, while the furnace floor 1a is continued to rotate at a predetermined speed, the pellets are fed onto the furnace floor 1a from the material feeding equipment 4.

The pellets that are charged onto the furnace floor 1a receive a combustion heat and a radiant heat from the combustion burner 3 in the course of movement through the reduction/melting zones $Z_1$ to $Z_3$. Thus, an iron oxide in the pellet is reduced by the carbonaceous reducing agent.

The reduced iron that is reduced substantially perfectly is subjected further to the heating and is melted, and then is cohered into granular melted metal irons while being separated from the by-produced slags. Then, the granular melted metal irons are cooled and solidified in the cooling zone $Z_4$ by a cooling unit 8, and then are raked sequentially out of the rotary furnace floor furnace 1 by the discharging unit 7 provided on the downstream side of the cooling unit 8.

At this time, the by-produced slags are also discharged at the same time together with the granular melted metal irons. However, the granular metal irons and the slags are separated by any separating unit (a sieve, a magnetic separator, or the like) after these materials are passed through a discharge hopper 9. Finally, the granular metal irons whose content of slag component is very small can be obtained.

Here, in FIG. 1, the interior of the furnace body 2 is divided into four zones. In this case, the number of divided zones may be changed appropriately.

2. Material Feeding Equipment

Figure 4:
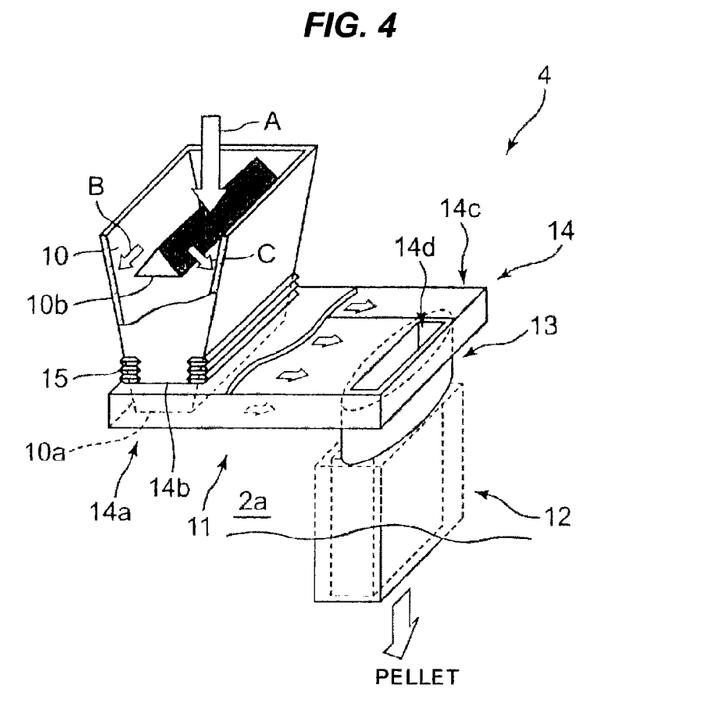
FIG. 4 is a partially-notched perspective view showing a configuration of a material feeding equipment of a feeding system for reduced iron material according to the present invention.

FIG. 4 is a perspective view showing a configuration of a material feeding equipment that constitutes the feeding system for reduced iron material.

In FIG. 4, the material feeding equipment 4 is equipped with a supply hopper 10 (hopper) for accepting the pellets that are dried by a drier (not shown), a vibrating feeder 11 arranged below a discharge port 10a of this supply hopper 10, a material charging portion 12 provided to penetrate into a top plate 2a (see FIG. 3) of the furnace body, and a connection portion 13 for connecting an outlet port of the vibrating feeder 11 and an inlet port of the material charging portion 12.

Next, configurations of respective portions will be explained hereunder.

2.1 Supply Hopper

The supply hopper 10 is constructed based on the loss-in-weight system, i.e., the system that controls an amount of supply by measuring a weight of the entire hopper and then calculating a weight reducing rate caused due to the material discharge.

The pellets are always accumulated to some extent in the supply hopper 10, and the accumulated pellets fulfill a function of a material seal that isolates the interior of the furnace from an outer air. When a level of the pellets accumulated in the supply hopper 10 come down to some extent, a slide gate 24 (see FIG. 11) positioned between the supply hopper 10 and a feed bin 23 (see FIG. 11) is opened. Thus, the pellets are supplied into the supply hopper 10 from the feed bin 23 located over the slide gate 24.

At this time, when the load of the pellets that come down into the supply hopper 10 from the upper side is applied at a time to the vibrating feeder 11 located below the supply hopper 10, an action of the vibrating feeder 11 is disturbed, which causes a harmful effect upon a pellet carrying precision.

For this reason, a load distributing plate (load distributing unit) 10b having a triangular section is provided to the upper portion in the supply hopper 10. This load distributing plate 10b is provided to distribute (divide) the load in arrows B and C directions such that the load of the pellets that are dropped intermittently from the feed bin 23 in an arrow A direction is not strongly applied onto a trough 14 of the feed bin 23.

Accordingly, such a situation is prevented that a proper action of the vibrating feeder 11 is inhibited by the application of the intermittent load. Also, a variation in an amount of supply of pellets can be lessened.

2.2 Vibrating Feeder

The vibrating feeder 11 is constructed mainly by the trough 14 for catching the pellets that are discharged from the supply hopper 10, and a vibration applying unit 16 (see FIG. 5) for causing the trough 14 to vibrate. In FIG. 4, such a situation is shown that the vibration applying unit 16 is removed, in order to explain a configuration of the trough 14.

2.2.1 Trough

The trough 14 is formed like a shallow box. When this trough 14 is hung substantially horizontally from a furnace body structure (not shown), such trough is put independently from the supply hopper 10.

A reception port 14b for receiving the pellets is formed in the upper surface of one end portion 14a of the trough 14. The discharge port 10a of the supply hopper is fitted into the trough 14 via the reception port 14b with some play.

The periphery of the reception port 14b and the discharge port 10a of the supply hopper 10 being fitted into the reception port 14b with some play are connected via an expansion joint 15, so that airtightness can be held between the supply hopper 10 and the trough 14.

A slit-like discharge port 14d is formed in the lower surface of the other end portion 14c of the trough 14. This slit-like discharge port 14d is formed in the width direction of the trough 14, and is formed to have the substantially same width as that of the trough 14.

2.2.2 Vibration Applying Unit

Figure 5:
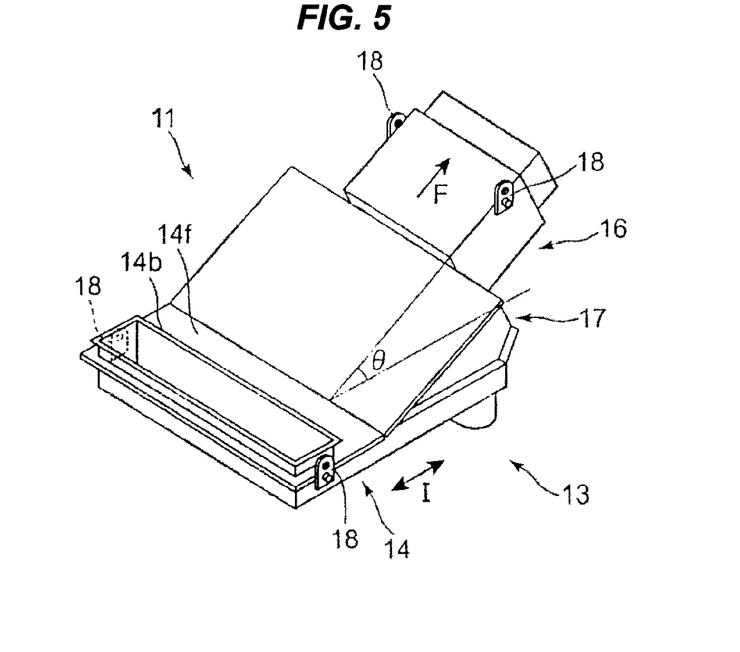
FIG. 5 is a perspective view of a vibrating feeder of the material feeding equipment when viewed from the top side.
Figure 6:
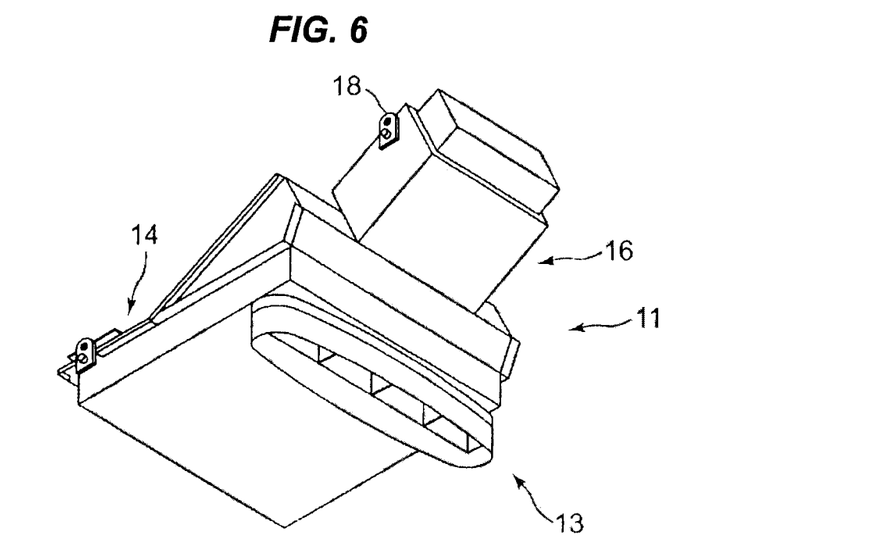
FIG. 6 is a perspective view of the vibrating feeder of the material feeding equipment when viewed from the bottom side.

FIG. 5 is an exterior view of the vibrating feeder 11 when viewed from the top side, and FIG. 6 is also an exterior view of the vibrating feeder 11 when viewed from the bottom side.

In both Figures, the vibration applying unit 16 is provided to a cover 14f of the trough 14 in an inclined state to the trough 14, which is arranged in the horizontal direction, by a predetermined fitting angle θ. Concretely, this vibration applying unit 16 is constructed by an electromagnetic coil, a permanent magnet, and springs.

In the vibration applying unit 16 of this type, an amount of supply of the pellets can be controlled by adjusting a voltage applied to the electromagnetic coil.

A vibration transmission frame 17 is interposed between the vibration applying unit 16 and the trough 14. This vibration transmission frame 17 is formed like a wedge shape when viewed from the lateral side, and is constructed like a box shape whose lateral width is same as that of the trough 14 such that a vibration applying force F of the vibration applying unit 16 is transferred uniformly to the trough 14 over its whole width.

Also, the vibration applying force F is designed to pass through a whole center of gravity of both the trough 14 and the vibration transmission frame 17.

When the vibration applying unit 16 is driven, the trough that received the vibration applying force F via the vibration transmission frame 17 is caused to vibrate in the longitudinal direction (the I direction). Hence, the pellets that are fed to one end portion 14a of the trough 14 are carried up to the slit-like discharge port 14d (see FIG. 4).

2.3 Connection Portion

Figure 7A:
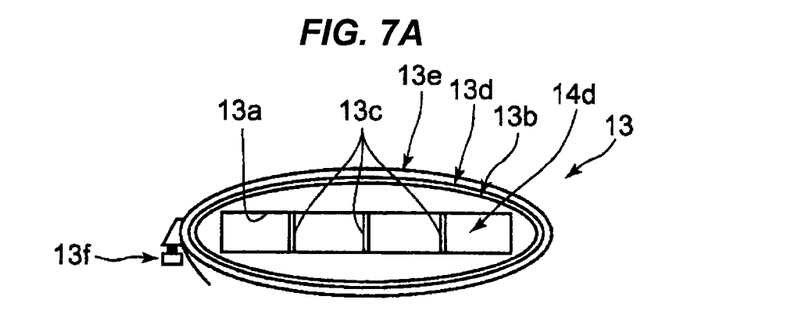
FIG. 7A is a bottom view showing a configuration of a connection portion shown in FIG. 4.
Figure 7B:
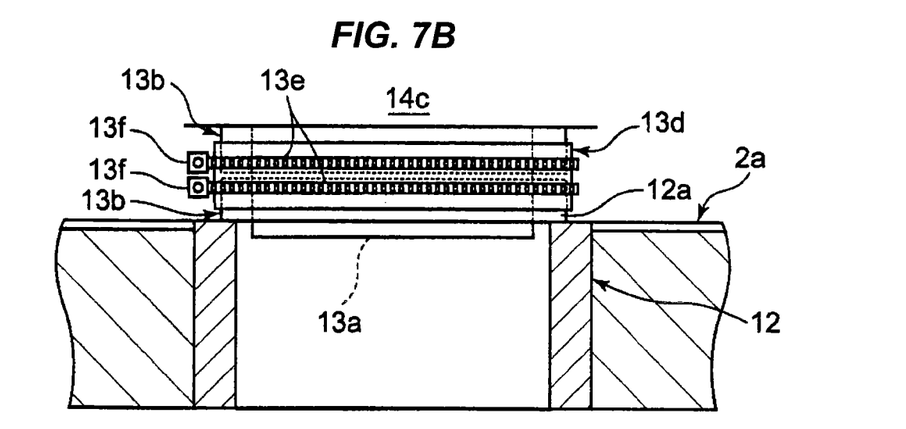
FIG. 7B is a front view showing a sealing structure of the connection portion.

FIG. 7A is a bottom view of the connection portion 13 when viewed from the bottom side, and FIG. 7B is a front view showing a sealing structure of the connection portion 13.

In both Figures, the connection portion 13 constitutes the slit-like discharge port 14d, and has an exit chute (exit portion) 13a that is formed like a square cylinder shape whose width is substantially same as that of the trough 14. This exit chute 13a is protruded further downward from a cylinder body 13b that is provided downward from the other end portion 14c of the trough 14 and has an oval-shaped section.

The reasons why the cylinder body 13b is formed into an oval shape are given as follows.

In order to prevent the cracking and the powdering of the pellet, it is preferable that the vibrating feeder 11 should be provided in as low the position as possible. In order to render such arrangement feasible, it is impossible to keep a large space between the exit portion of the vibrating feeder 11 and the furnace body ceiling. As a result, it is very difficult for the worker to access the connection portion that is located in a limited area between the vibrating feeder 11 and the furnace body.

Therefore, the cylinder body 13b with the exit chute 13a is formed like an oval shape, so that the cylinder body 13b can be fastened uniformly and simply as a whole only when a metal band is wound around this cylinder body. Accordingly, it becomes possible for the worker to access the vibrating feeder 11 from the only one side and the lateral side, and thus its maintenance can be facilitated.

Also, a plurality of reinforcing ribs 13c are provided in the exit chute 13a. These reinforcing ribs 13c are provided to prevent such an event that the exit chute 13a and its peripheral portion that are exposed to a radiant heat emitted from the furnace floor are thermally deformed.

In detail, it is highly possible that the thermal deformation of the exit chute 13a facing to the inside of the furnace is caused by a radiant heat emitted from the furnace floor and the in-furnace gas. Thus, it is feared that, when such deformation is caused, the uniform discharge of the pellets is disturbed. For this reason, the reinforcing ribs 13c are provided in the cylindrical hole of the exit chute 13a. As a result, a shape of the exit chute 13a can be maintained without the thermal deformation, and an amount of proper supply of the pellets can be ensured, and also the uniform supply of the pellets can also be ensured in the width direction of the exit chute 13a.

In contrast, a cylinder body 12a whose section is formed like an oval shape is also provided upright to the upper end portion of the material charging portion 12 to oppose to the cylinder body 13b. A heat-resistant sealing material 13d, e.g., a cloth formed of an aramid polymer fiber, is wound to spread over the downward-provided cylinder body 13b and the upright-provided cylinder body 12a.

Then, a fastening metal band 13e is wound around the upper part and the lower part of the sealing material 13d respectively. Then, the sealing material 13d is fixed by turning fastening components (screws) 13f, each of which can be screwed into hole portions that are aligned at equal intervals in the metal band 13e, in the fastening direction respectively.

Both sections of the cylinder bodies 13b and 12a are formed into an oval shape. Therefore, as described above, the metal band 13e can be fastened uniformly over a full circumference by using one fastening component 13f.

In this case, the exit chute 13a is arranged to come down slightly lower into an upper surface of the top plate 2a of the furnace body. Therefore, such a situation can be prevented that the powders of the reduced iron material are accumulated on the connection portion.

In more detail, the pellets together with no small quantity of powders are fed to the rotary furnace floor furnace 1. In this state, due to a gas flow generated in the furnace and a turbulent flow effect of the gas caused by the drop of the pellets, these powders are ready to swirl up around the exit portion of the vibrating feeder 11. Therefore, special care should be taken to prevent such a situation that the swirled powders are accumulated around the exit portion, as far as possible.

This is because the accumulated powders come down on the furnace floor as the lump-shaped materials to cover the pellets at the moment when the accumulated powders grow up to the lump to some extent, which prevents a radiant heat from entering into the pellets and also acts as the cause to hinder a proper reaction.

Therefore, in the present embodiment, the accumulation of the powders is prevented by overlapping a lower end of the exit chute 13a of the vibrating feeder 11 with the material charging portion 12.

Also, the material charging portion 12 is subjected to a radiant heat from the in-furnace gas and the furnace floor, and is brought into a high temperature. For this reason, such material charging portion 12 has a water cooling structure (water cooling wall). In this case, when the water cooling system is employed, a radiant heat absorbed by the water makes a heat loss and is carried out of the system by the cooling water.

Therefore, in the present embodiment, a thermal deformation of the material charging portion 12 itself is suppressed by the water cooling, but the outside of the material charging portion 12 is covered with a refractory to suppress a heat loss as small as possible.

3. Feeding System for Reduced Iron Material

Figure 8:
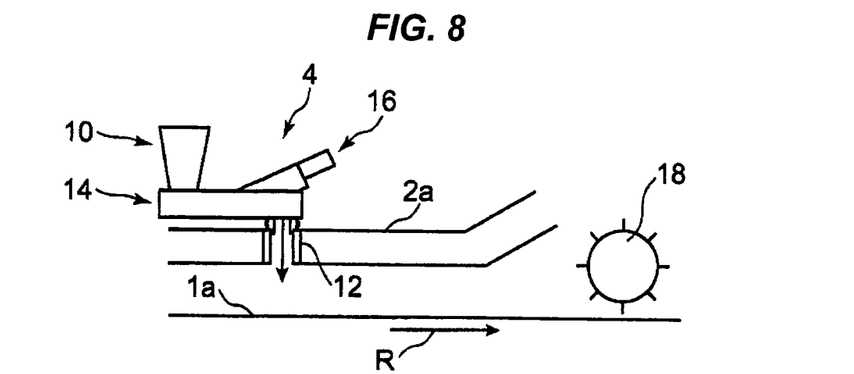
FIG. 8 is a schematic side view showing a configuration of the feeding system for reduced iron material.

FIG. 8 is a schematic side view showing a configuration of the feeding system for reduced iron material in which a plurality of the material feeding equipments each constructed as above are arranged in the furnace width direction.

In FIG. 8, the pellets being fed from the supply hopper 10 onto the trough 14 are guided to the slit-like discharge port 14d (see FIG. 7A) while being moved on the trough 14. Then, the pellets are fed onto the furnace floor 1a through the material charging portion 12 that is provided to penetrate into the top plate 2a of the furnace body, and then are carried in the furnace floor traveling direction R.

Even when a part of the pellets being carried in the furnace floor traveling direction R is stacked in two layers or more, the pellets can be leveled in one layer by arranging a leveling screw 18 on the downstream side of the material charging portion 12 in the furnace floor traveling direction R.

Also, a drop height of the pellets from the slit-like discharge port 14d of the trough 14 to the furnace floor 1a should be set preferably to 1,200 mm or less, and more preferably to 1,000 mm or less.

When a drop height of the pellets is set to 1,200 mm or less, such an advantage can be achieved that the cracking or the powdering of the pellets caused by the dropping impact of the pellet can be prevented, while suppressing somewhat a flow velocity of an in-furnace gas to such extent that fine grains of the furnace floor material are not blown away.

Table 1 shows that respective states of the cracking or the powdering caused by the drop of the pellet were investigated when the pellet drop test was done.

TABLE 1

| Drop Height mm | % | | | | Wt(g) | | | |
| --- | --- | --- | --- | --- | --- | --- | --- | --- |
| | Ball | Chip | Fine | Total | Ball | Chip | Fine | Total |
| 600 | 99.8% | 0.0% | 0.2% | 100.0% | 956.4 | 0.0 | 2.3 | 958.7 |
| 800 | 99.6% | 0.1% | 0.2% | 100.0% | 1021.9 | 1.4 | 2.5 | 1025.8 |
| 1000 | 99.5% | 0.0% | 0.4% | 100.0% | 908.1 | 0.4 | 3.9 | 912.4 |
| 1200 | 98.6% | 0.7% | 0.7% | 100.0% | 918.5 | 6.2 | 6.7 | 931.4 |
| 1400 | 94.7% | 4.4% | 0.8% | 100.0% | 941.1 | 44.1 | 8.2 | 993.4 |
| 1600 | 88.1% | 10.6% | 1.3% | 100.0% | 903.7 | 108.5 | 13.8 | 1026.0 |
| 1800 | 86.5% | 11.7% | 1.8% | 100.0% | 754.7 | 102.3 | 15.3 | 872.3 |

In Table 1, "Ball" denotes the pellet whose average particle diameter of 19 mm is maintained, "Fine" denotes the powder and the chip whose size is within 2.4 mm mesh, and "Chip" denotes the pellet whose average particle diameter is deformed smaller than a half of the average particle diameter of 19 mm, and respective results are indicated by (%) and Wt (g).

In the drop test, almost 100 pieces of the pellet were dropped individually on the iron plate from respective drop heights (7 stages within 600 mm to 1,800 mm) every time, and then all the pallets in "Ball", "Fine", and "Chip" left on the iron plate were recovered and then were classified by using a sieve.

Figure 9:
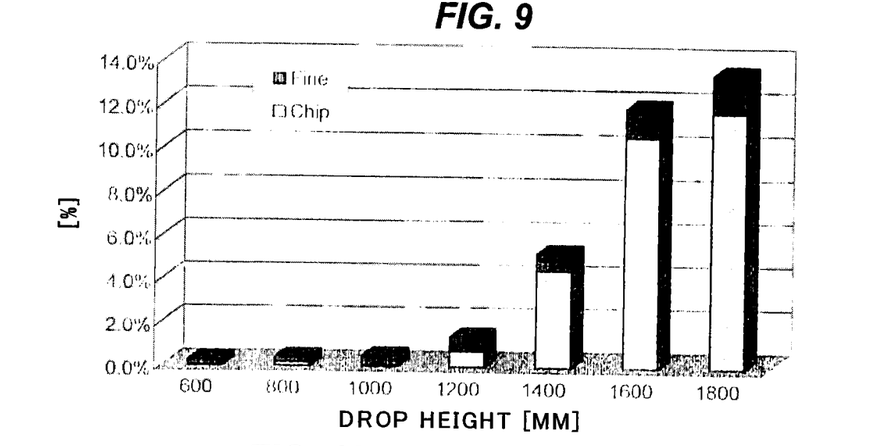
FIG. 9 is a graph showing the results of a pellet drop test.

FIG. 9 is a graph showing amounts of the pallets in "Fine" and "Chip" at every drop height. There is such a tendency that, as the drop height is increased higher, amounts of the pallets in both "Fine" and "Chip" are increased larger.

Figure 10:
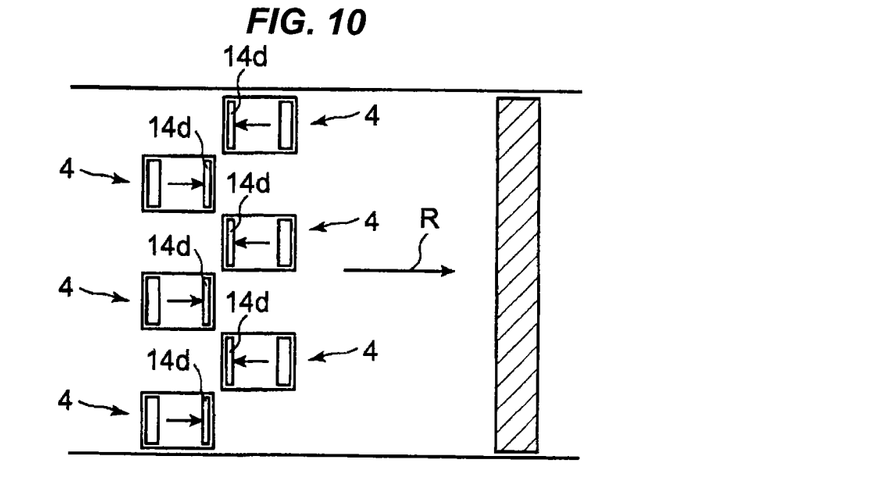
FIG. 10 is a schematic plan view showing a configuration of the feeding system for reduced iron material.

Also, FIG. 10 is a schematic plan view showing an arrangement of the material feeding equipments in the feeding system for reduced iron material.

In FIG. 10, six material feeding equipments 4 of the present embodiment are arranged in a zigzag fashion in the width direction of the top plate 2a.

It may be considered that, in contrast to such zigzag arrangement, six material feeding equipments 4 are aligned side by side with each other in the furnace width direction. In this case, when these material feeding equipments 4 are aligned side by side, their vibrating feeders, their supply hoppers, and their weighing machines cause the mutual interference. As a result, it is difficult to align the neighboring slit-like discharge ports 14d in close vicinity to each other.

Here, the arranged number of the material feeding equipments 4 is decided depending on the furnace width of the rotary furnace floor furnace and the width of the material feeding equipment 4.

In order to manufacture the metal iron in a large scale by the mobile furnace floor type reduction melting furnace, it is necessary to expand the furnace width. According to such arrangement of the material feeding equipments 4, the pellets can be fed uniformly onto the furnace floor of such large-sized furnace, and also an amount of supply can be controlled simply with good precision.

Figure 11:
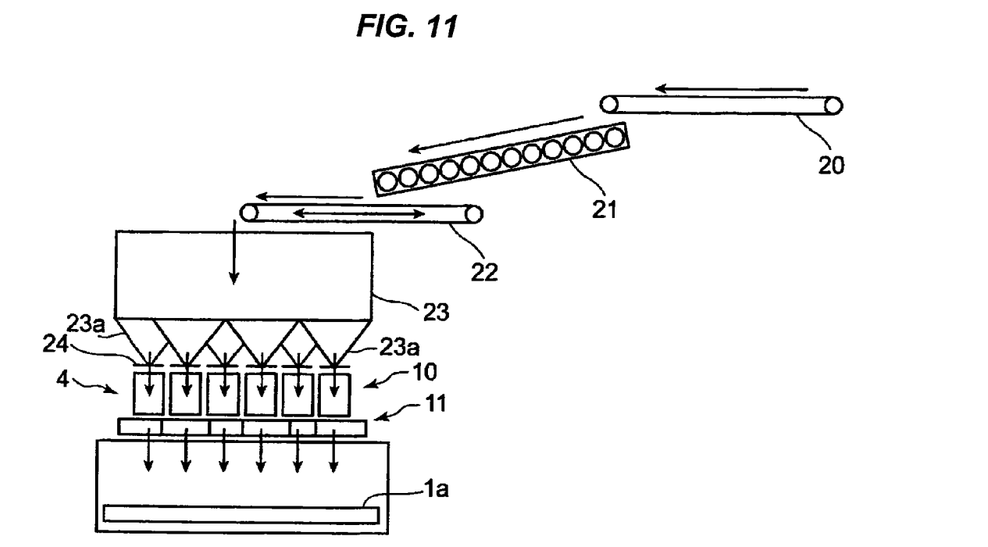
FIG. 11 is a schematic front view of a distributing and feeding equipment according to the present invention.

FIG. 11 shows a schematic configuration of the equipment for feeding the pellets to the supply hoppers 10.

In FIG. 11, the pellets being dried by the drier are carried by a belt conveyor 20 and a roller screen (sieving unit) 21, and are charged uniformly into the feed bin 23 by a shuttle conveyor 22.

The feed bin 23 is equipped with discharge portions 23a the number of which corresponds to the number of the vibrating feeders 11, and feeds the pellets to the supply hoppers 10 respectively.

The shuttle conveyor 22 is provided to charge the pellets and the powders produced from the pellets (the powders that have not been removed by the roller screen 21 yet) into the feed bin 23, while distributing the pellets and the powders. This shuttle conveyor 22 is constructed such that the powders, which are carried together with the pellets, can be distributed uniformly in the furnace width direction. Accordingly, such a situation can be prevented that the powders are fed only to a part of the vibrating feeders in an unbalanced condition.

Here, the shuttle conveyor 22 may be constructed by a swing conveyor or a reciprocating conveyor.

Also, the roller screen 21 is arranged on the upstream side of the shuttle conveyor 22 in course of the flow along which the pellets are fed. This roller screen 21 is constructed to pass the powders, which are produced until the pellets are fed to the material feeding equipment 4, through a sieve and remove such powders prior to the feed bin 23.

The shuttle conveyor 22 and the feed bin 23 functions as the distributing and feeding equipment that distributes/feeds the pellets to respective supply hoppers 10 every predetermined amount.

Here, in course of carrying the pellets after the materials are formed into the lump, the powders are produced in no small quantities by the drop during while the pellets are supplied to the transit portions of the conveyors and various hoppers.

When the powders produced from the pellets being subjected to the powdering are fed unevenly onto the furnace floor and then a part of pellets or all pellets on the furnace floor are covered with the powders, a radiant heat that is to be transferred uniformly from the combustion burner to the pellets is blocked and also a promotion of the reduction melting reaction of the pellets is impeded.

As a result, the reaction is delayed in the pellets that are subjected to the influence of the powdering, and the reduced iron is produced from the pellets in an insufficient reaction state, and thus the productivity is lowered. Accordingly, it is desirable that these powders should not be fed to the furnace floor as far as possible.

Therefore, in the above equipment for feeding the pellets to the supply hoppers 10, the pellets are passed through the roller screen 21 and put through a sieve at the prior stage that the pellets are fed to the supply hoppers 10, and thus the powders are sifted out from the pellets. Therefore, most of the powders are removed.

In this case, the powders that have not been removed yet are distributed uniformly onto the feed bin 23 by using the shuttle conveyor 22, and further are leveled uniformly in the width direction in respective material feeding equipments 4. Consequently, even when either a slight amount of powders are fed together with the pellets or a size of the furnace floor is increased, either the pellets or the pellets containing the powders can always be fed uniformly onto the furnace floor in an imbalance-redressed state.

Although the present invention has been explained in detail as described above with reference to specific embodiments thereof, it is obvious to those skilled in the art that the present invention is susceptible of various changes and modifications without departing from the spirit and scope of the present invention. The present application is based on Japanese Patent Application (Patent Application No. 2010-196061) filed on Sep. 1, 2010, the contents of which are incorporated herein by reference.

EXPLANATIONS OF LETTERS AND NUMERALS 1 rotary furnace floor furnace (mobile furnace floor type reduction melting furnace)
1a furnace floor
2 furnace body
2a top plate
3 combustion burner
4 material feeding equipment
6 furnace floor material charging equipment
7 discharging unit
8 cooling unit
9 discharge hopper
10 supply hopper
10a discharge port
10b load distributing plate
11 vibrating feeder
12 material charging portion (water cooling wall)
12a cylinder body
13 connection portion
13a exit chute (exit portion)
13b cylinder body
13c reinforcing rib
13d sealing material
13e metal band
13f fastening component
14 trough
14a one end portion
14b reception port
14c the other end portion
14d slit-like discharge port
14f cover
15 expansion joint
16 vibration applying unit
17 vibration transmission frame
18 leveling screw
20 belt conveyor
21 roller screen
22 shuttle conveyor
23 feed pin

The invention claimed is:

1. A feeding system for reduced iron material, comprising:
a plurality of material feeding equipments provided in a furnace width direction of a mobile furnace floor type reduction melting furnace, wherein
each of the material feeding equipments includes:
a hopper configured to receive reduced iron materials and discharge the materials from a discharge port;
a trough configured to connect the discharge port and a material charging portion of the mobile furnace floor type reduction melting furnace and configured to receive the reduced iron materials discharged from the discharge port;
an exit portion provided on an exit side of the trough; and
a vibration applying unit configured to cause the trough to vibrate along a furnace floor moving direction, wherein
the material feeding equipments are arranged in a zigzag fashion in the furnace width direction.

2. The feeding system according to claim 1, wherein
a connection portion configured to connect an exit portion of the trough and the material charging portion of the mobile furnace floor type reduction melting furnace is formed into an oval shape when viewed from a top side.

3. The feeding system according to claim 2, wherein
a height from a furnace floor of the mobile furnace floor type reduction melting furnace to the exit portion of the trough is set to 1,200 mm or less.

4. The feeding system according to claim 2, wherein
the material charging portion has a water cooling wall.

5. The feeding system according to claim 2, wherein
a load distributing unit is provided to an upper portion of the hopper.

6. The feeding system according to claim 2,
wherein a reception port configured to receive the reduced iron material is provided on an inlet side of the trough, and the discharge port of the hopper and the reception port are connected via an expansion joint that has airtightness.

7. The feeding system according to claim 2, further comprising a metal band wound around the connection portion.

8. The feeding system according to claim 1, wherein
a height from a furnace floor of the mobile furnace floor type reduction melting furnace to the exit portion of the trough is set to 1,200 mm or less.

9. The feeding system according to claim 1, wherein
the material charging portion has a water cooling wall.

10. The feeding system according to claim 1, wherein
a load distributing unit is provided to an upper portion of the hopper.

11. The feeding system according to claim 1
wherein a reception port configured to receive the reduced iron material is provided on an inlet side of the trough, and the discharge port of the hopper and the reception port are connected via an expansion joint that has airtightness.

12. The feeding system according to claim 11, wherein the expansion joint comprises a sealing material that has flexibility.

13. The feeding system according to claim 1, further comprising
a distributing and feeding equipment configured to distribute and feed the reduced iron materials to respective supply hoppers every predetermined amount.

14. The feeding system according to claim 13, wherein a screen unit is provided on an upstream side of the distributing and feeding equipment in a flow along which the reduced iron materials are fed.

15. A feeding system for reduced iron material, comprising:
a plurality of material feeding equipments provided in a furnace width direction of a mobile furnace floor type reduction melting furnace, wherein
each of the material feeding equipments includes:
a hopper configured to receive reduced iron materials and discharge the materials from a discharge port;
a trough configured to connect the discharge port and a material charging portion of the mobile furnace floor type reduction melting furnace and configured to receive the reduced iron materials discharged from the discharge port;
an exit portion provided on an exit side of the trough; and
a vibration applying unit configured to cause the trough to vibrate along a furnace floor moving direction, wherein
a rectangle chute is provided as the exit portion, and reinforcing ribs are provided in the chute.

16. The feeding system according to claim 15, wherein a lower end of the chute is provided to overlap with the material charging portion.

17. The feeding system according to claim 15, wherein a height from a furnace floor of the mobile furnace floor type reduction melting furnace to the exit portion of the trough is set to 1,200 mm or less.

18. The feeding system according to claim 15, wherein the material charging portion has a water cooling wall.

19. The feeding system according to claim 15, wherein a load distributing unit is provided to an upper portion of the hopper.

20. The feeding system according to claim 15, wherein a reception port configured to receive the reduced iron material is provided on an inlet side of the trough, and the discharge port of the hopper and the reception port are connected via an expansion joint that has airtightness.

* * * * *